United States Patent [19]
Morris et al.

[11] Patent Number: 5,590,913
[45] Date of Patent: Jan. 7, 1997

[54] PIPELINE CONNECTOR FOR CONNECTING A BRANCH PIPE TO A CARRIER PIPE

[75] Inventors: Bruce E. Morris, Houston; Fred L. Avery, Spring, both of Tex.

[73] Assignee: Big Inch Marine Systems, Houston, Tex.

[21] Appl. No.: 429,745

[22] Filed: Apr. 26, 1995

[51] Int. Cl.$^6$ .................................................. F16L 35/00
[52] U.S. Cl. ........................... 285/18; 285/197; 285/322; 285/373
[58] Field of Search ............................. 285/18, 322, 323, 285/197, 373, 419

[56] References Cited

U.S. PATENT DOCUMENTS

| | | | |
|---|---|---|---|
| 873,689 | 12/1907 | Van Winkle | 285/373 X |
| 3,713,675 | 1/1973 | White | 285/322 X |
| 3,744,822 | 7/1973 | Arnold | 285/322 X |
| 4,049,297 | 9/1977 | Reneau | 285/322 X |
| 4,050,720 | 9/1977 | Reneau | 285/323 X |
| 4,223,925 | 9/1980 | Reneau et al. | 285/323 X |
| 4,381,871 | 5/1983 | Dopyera et al. | |
| 4,728,125 | 3/1988 | Reneau | 285/322 X |
| 5,040,828 | 8/1991 | Kane | 285/373 X |

*Primary Examiner*—Dave W. Arola
*Attorney, Agent, or Firm*—Arnold, White & Durkee

[57] ABSTRACT

There is disclosed a clamp useful for connecting a tie-in line transversely to a carrier pipe, comprising: a lower body portion and a upper body portion that when connected together define a tubular bore, the lower and upper body portions being adapted to clamp onto the carrier pipe; a set of gripping collets positioned with the tubular sleeve bore proximate opposed ends of the upper and the lower body portions to engage such a carrier pipe; a branch tap positioned between the gripping collets and extending from one of the body portions transversely to the tubular bore; a first seal and a second seal for providing a seal between the carrier pipe and the upper and the lower body portions, the first and second seal positioned within the transverse bore and between the gripping collets and the branch tap; and a set of axial seals to form axially extending seals between the upper and lower body portions during use and to connect the first and second seals during use. The connector is particularly useful to attach branch pipes to oil or gas carrier pipes submersed undersea.

33 Claims, 3 Drawing Sheets

PIPELINE CONNECTOR FOR CONNECTING A BRANCH PIPE TO A CARRIER PIPE

BACKGROUND OF THE INVENTION

This invention relates to devices for connecting a tie-in line or branch pipe to a carrier pipe. More particularly, this invention relates to tee connectors used in subsea applications for connecting branch pipes to carrier pipes typically used for carrying oil or gas.

It is common in the oil industry to connect a tie-in line or pipe, also referred to as a branch line, to a carrier pipe, also referred to as an export or main line. To accomplish this, tee connectors have been employed which grip and mount the pipe. Such prior tee connectors have a branch tap flange to which the branch pipe is affixed after a hole is bored into the carrier pipe through the bore of the branch tap flange. When the carrier pipe is in an environment where a connector can be welded to a pipe, this method using a suitable connector is typically employed. However, in some environments, such as when the carrier pipe is submersed undersea affixing a connector to the carrier pipe becomes more problematic.

Prior tee connectors for undersea applications employed annular seals and gripping means configured such that the annular seals where at the opposed ends of a connector, with the gripping means internal to the seals. In these tee connectors, longitudinal seals are needed which extend over the length of the connector up to the annular seals. A problem exists, however, since such tee connectors have a large pressure boundary (internal volume) where seal failure can occur.

Another problem with the prior connectors is that the connectors employ a single means for actuating the grips and seals. Hence, if the seals and grips require different amounts of pressure, such pressures cannot be independently set. Thus, for example, the grips may require an amount of pressure to engage the pipe which results in too much pressure on the seals whereby the seals extrude, thereby destroying the seals.

It can be seen that a need exists to alleviate one or more of these problems and disadvantages of prior tee connectors.

SUMMARY OF THE INVENTION

The present invention concerns tee connectors which address one or more of the problems described above.

In one broad respect, the present invention is a clamp useful for connecting a tie-in line to a carrier pipe, comprising:
a lower body portion and a upper body portion that when connected together define a tubular sleeve bore, the lower and upper body portions being adapted to clamp onto the carrier pipe;
a set of gripping collets positioned with the tubular sleeve bore on opposed ends of the upper and lower body portions to engage the carrier pipe;
a branch tap positioned between the gripping collets and extending from one of the body portions transversely to the tubular bore;
a first seal and a second seal for providing a seal between the carrier pipe and the upper and lower body portions, the first and second seals being positioned within the transverse bore and between the gripping collets and the branch tap; and
a set of axial seals to form axially extending seals between the upper and lower body portions during use and to connect the first and second seals during use.

In a second broad respect, this invention is a pipeline connector for mounting onto a carrier pipe to provide a branch tap for use in connecting a branch pipe transversely to such a carrier pipe, the pipeline connector comprising:
a lower body portion and an upper body portion adapted to be clamped together about such a carrier pipe, the body portions having tubular bore sections to define a tubular bore for receiving such a carrier pipe;
a branch tap for use in connecting to a branch line, the branch tap extending from one of the body portions transversely to the tubular bore of the pipeline connector;
two sets of gripping collets positioned within the tubular bore sections, the one set being positioned to one side of the branch tap and the other set being positioned to the other side of the branch tap, the sets of collets being adapted to form a gripping engagement between the pipeline connector and a carrier pipe during use;
one set of annular seals being positioned in the tubular bore sections between the branch tap and one of the sets of gripping collets, and another set of annular seals being positioned in the tubular bore sections between the branch tap and the other of the sets of gripping collets, the sets of annular seals being adapted to form annularly extending seals between the tubular bore and a carrier pipe during use; and
a set of axial seals to form axially extending seals between the upper and lower body portions during use and to connect the annular seals during use.

The connector of this invention advantageously employs seals inward ("inboard") to the gripping collets, thereby decreasing the size of the pressure boundary and isolates the gripping collets from the potentially harmful effects of the material in the carrier pipe. Since the pressure boundary is lessened, the size of any longitudinal (or "axial") seal used is also decreased in size, and the performance of such longitudinal seal is improved. If desired, the gripping collets can readily be protected from the corrosive effects of the sea water by manually applying grease thereto, or by injecting grease through appropriately located injection ports such that the exposed surfaces are coated.

The connector also advantageously employs independently actuable means for actuating the seals and means for actuating the gripping collets. This attribute has the advantage that the amount of pressure required for the gripping collets and the seals can be independently and more precisely controlled.

The connector of this invention may be used in a variety of applications where a tie-in line is desired to be affixed to a pipe. The carrier pipe may carry a wide variety of materials such as oil, refined oil products and distillates, gaseous or liquid materials and other flammable or potentially hazardous organic substances. The connectors of this invention can be of various sizes and, generally, are adapted to fit carrier piping of from about one inch in external diameter to about 48 inches in external diameter. The connector of this invention is particularly well suited in applications where it is undesirable to weld a connector to the carrier pipe, such as when the pipe is submersed undersea, when the pipe carries flammable or potentially hazardous substances, or when the pipe is in an environment where potentially flammable or explosive fumes are present.

The connector of this invention has particular application as a hot tap connector where it is used to make a connection to a carrier pipe without interrupting the flow of fluid in the carrier pipe.

DETAILED DESCRIPTION OF THE PREFERRED EMBODIMENTS

Figure 1:
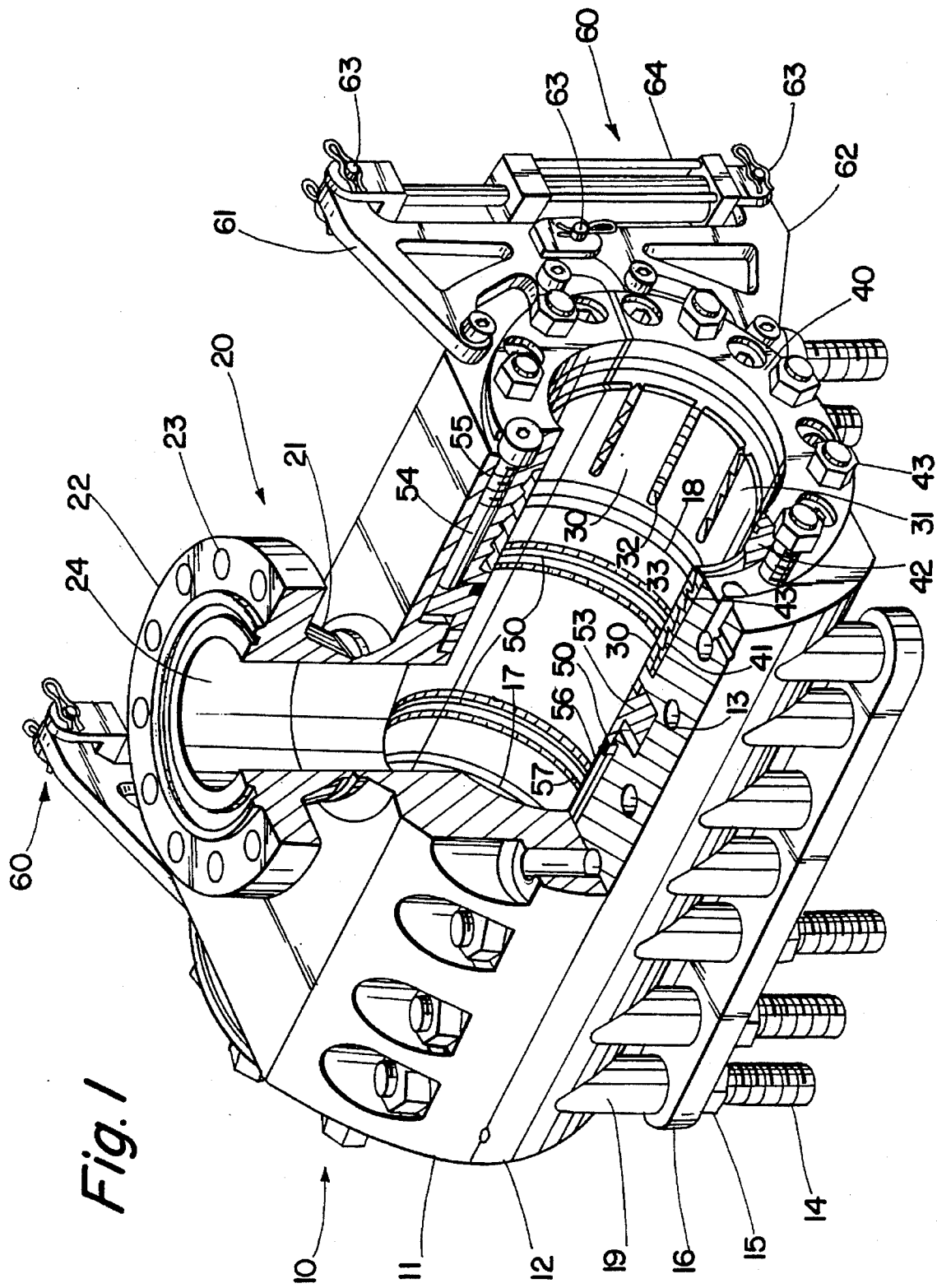
FIG. 1 shows a perspective view of one preferred embodiment connector of this invention, including a partial sectional view.

Referring to FIG. 1, there is seen a representation of one embodiment of the tee connector of this invention. The connector 10 includes upper and lower body portions 11 and 12. The upper and lower body portions 11 and 12 include a plurality of transverse bores 13 on opposite sides of the upper and lower body portions 11 and 12 for receiving a plurality of bolts or studs 14 to connect the upper and lower body portions 11 and 12. A plurality of nuts 15 are employed in connection with the bolts or studs 14. In FIG. 1 there is shown a central transverse bore defined by upper and lower transverse bore sections 17 and 18 of the upper and lower body portions 11 and 12. The upper and lower body portions 11 and 12 can be cast or machined using well known methods to provide the desired size and shape, and can be made of a variety of metals or alloys. Preferred materials from which to prepare the upper and lower body portions 11 and 12 include steel, steel alloys and corrosion resistant alloys. The particular alloys will be those prescribed by standard specifications for the particular applications intended and are well known to those of ordinary skill in this art.

In the embodiment of this invention depicted in FIG. 1, there is also shown a pair of extension bars 16 which provides support during tensioning of body studs 14. The extension bars 16 are attached to stud extension tubes 19 which position and affix the extension bars 16 to lower body portion 12. Without the extension bars 16, the stud extension tubes 19 would still be needed, but mushroom heads, which add weight and cost to the connector 10, would be needed to provide a footing for the conventional tensioning devices. The extension bars 16 facilitate lesser spacing between body studs 14 relative to a connector without such extension bars and advantageously provide more uniform distribution of stud loading along the length of the connector 10 during tensioning.

A branch tap 20 for connecting a tie-in line or branch pipe to a carrier pipe is attached to the upper or lower body portion, with the branch tap 20 being attached to the upper body portion 11 in FIG. 1 and positioned between the opposed ends of the connector 10. It should be understood that the position of the branch tap 20 is not critical, nonetheless, the branch tap 20 needs to be positioned between the set of annular seals 50. Similarly, the bore defined by the body tap 20 can be at any angle relative to the transverse bore. In the embodiment of this invention shown in FIG. 1, the branch tap bore 24 is substantially perpendicular to the central axis of the transverse bore defined by the upper and lower body portions 11 and 12. While the branch tap 20 depicted in FIG. 1 comprises a branch tap body 21 and branch tap flange 22, one of ordinary skill in the art may appreciate that the branch tap 20 can be fitted with a variety of end pieces including a conventional weldneck flange, a ball flange and a ball valve. The branch tap 20 depicted in FIG. 1 may be conveniently attached by, for example, welding the branch tap body 21 to the connector. The branch tap flange 22 includes a plurality of transverse branch tap flange bores 23 for receiving bolts or studs to secure the branch tap flange 22 to a secondary branch flange and pipe, not shown. It is seen that the branch tap 20 and upper body portion 11 define a branch tap bore 24 through which the material in the branch pipe, not shown, may flow to or from the carrier pipe which may be connected to the branch tap 20. As one of skill in the art may appreciate, a gasket, or an elastomeric seal ring seated in a recess of the branch tap flange 22, may be additionally used when securing the branch tap flange 22 to the secondary pipe and flange.

In FIG. 1, gripping collets 30 are located at opposed ends of the connector 10. In preferred embodiments, the gripping collets 30 have serrations on surfaces 31 that engage the carrier pipe and have axial slits 32 from opposed ends, with such slits 32 in alternating arrangement such that each slit is directed in the opposite direction relative to the direction of its two adjacent slits.

The gripping collets shown in FIG. 1 are in the form of semi-circular collet sections which constitute an annular ring when the body portions are bolted together. One of ordinary skill in the art may appreciate, however, that the shape of the collet section can vary depending on the shape of the carrier pipe and also that the gripping collets can be further segmented such that each body portion employs two or more collet segments. If the gripping collets are further segmented, the segments need to be independently secured during installation, the requirements and procedures for which are well known to one of ordinary skill in the art. If the collets are further segmented, the slits depicted in FIG. 1 may not be needed.

In the embodiment of this invention shown in FIG. 1, there are also shown collet drivers 40 on opposed ends of the upper and lower body portions 11 and 12. The collet drivers 40 comprise collet driver sleeves 41 and a collet driver flanges 42. The collet drivers 40 are for actuating the gripping collets 30. In preferred embodiments, the gripping collets 30 and collet drivers 40 are annular in shape such that when the upper and lower body portions 11 and 12 are connected, the gripping collets 30 and collet drivers 40 form arcuate, concentric rings. In preferred embodiments, the gripping collets 30 and collet driver sleeves 41 each define a plurality of complementary inclined ramps 33 and 43, respectively, to provide slidable engagement between the gripping collets 30 and collet drivers 40 such that relative axial displacement the driver sleeves will radially compress the gripping collets 30 to engage the carrier pipe. In the embodiment shown in FIG. 1, upon such compression, the slits 32 allow the gripping collets 30 to deform to thereby uniformly engage the carrier pipe. The collet driver 40 may also include a shoulder on the collet driver sleeve 41, which advantageously prevents catastrophic movement of the collet drivers 40 when engaging the gripping collets 30, to thereby force tensile failure rather than compressive failure of the carrier pipe. The shoulder can be positioned at the last ramp of the collet driver sleeve, or can be positioned as a protrusion added to the last ramp of the gripping collets to achieve the same result.

In FIG. 1, each collet driver flange 42 has a plurality of collet bores for receiving bolts or studs 43 for attaching the collet driver 40 to each respective connector end and for drawing the collet driver sleeve 42 toward the opposite end of each body to thereby provide axial (lateral) pressure to the ramps 33 of the gripping collets 30 to force the gripping collets 30 in a direction radially inward toward the central axis of the sleeve bore such that the gripping collets 30 forcibly engage the pipe.

In FIG. 1, seals 50 in the upper and lower body portions 11 and 12 together define annular rings for sealing the connector. The seals 50 are positioned in recesses in the body portions. The lower body portion 12 has axial seals 56 on opposed sides, with the axial seals 56 positioned in a recess in the lower body portion 12. The axial (longitudinal) seals 56 may comprise primary axial seals which abut seals 50 and secondary axial seals outboard to the primary axial seals with the secondary axial seals abutting the outer edge of seals 50 as shown in FIG. 1. Axial seals 56 can be glued into place. It can be seen that upon connecting the upper and lower body portions 11 and 12 together, seals 50 and axial seals 56 provide a seal for connector 10 and define the pressure boundary. As one of skill in the art may appreciate, the axial seals 56 can instead be positioned on the upper body portion 11, or can be included on both body portions. The seals 50 and axial seals 56 are preferably made from an elastomeric material, especially a fluoroelastomer based on the copolymer of vinylidene fluoride and hexafluoropropylene such as a "Viton™" fluoroelastomer. Such elastomeric materials are well known to those of skill in the art.

In the embodiment of the present invention represented in FIG. 1, the seals 50 are actuated by packer rings 53, with the packer rings 53 being actuated by packer rods 54. The packer rings 53 are positioned in a recess of the upper and lower body portions 11 and 12 proximate to the seals 50 such that the packer rings 53 are in slidable communication with the seals 50. The packer rods 54 are positioned in transverse bores in the body, each transverse bore aligned with an open bore of the collet driver flange 42. The packer rods 54 may be engaged by threaded set screws 55 that are threaded into the transverse bores, the threaded set screws 55 positioned such that upon being screwed into the body the threaded set screws 55 engage the packer rods 54 to thereby apply lateral (axial) pressure to the seals 50 such that the seals 50 engage the pipe.

In the preferred connector 10 shown in FIG. 1, there are also shown rigid girder rings 57 which are positioned in recesses of the upper and lower body portions 11 and 12, which prevent extrusion of the seals 50. The girder rings 57 also hold the seals 50 in place while the connector is being installed. Similarly, the upper and lower body portions 11 and 12 can be made with chamfered areas proximate to the seals 50 to prevent extrusion. The girder rings are not required in the practice of this invention.

In the connector 10 shown in FIG. 1, there are removable hydraulic hinges 60 which are adapted for opening and closing the upper and lower body portions 11 and 12 during use. The hydraulic hinges 60 may comprise an upper and a lower brackets 61 and 62 that are pivotably connected with roller pins 63 together and to the hydraulic piston member 64. The hydraulic hinges 60 can be removably attached by means of bolts, for example, with the hydraulic hinges 60 then being reused. The pins 63 are held in place by sets of cotter pins. The hydraulic hinges 60 can be removed after the connector 10 is installed on a carrier pipe. The hydraulic piston member 64 can be of a variety of designs and made from a variety of pistons, as is readily apparent to one of skill in the art. It should be also appreciated that the hydraulic hinges 60 depicted in FIG. 1 are not a required feature of the connector of this invention.

The materials used to make the connector 10 are well known to those of skill in the art. Preferred materials include ASTM A105 or A106 or A694-F grade steel for the upper and lower body portions 11 and 12 and for branch tap 20; grade A105 or A106 steel, or plate for the packer rings; AISI/SAE 4140 or 4130 for the collet drivers 40 and gripping collets 30; AISI/SAE 4140 or 4130 cold drawn materials for the packer rods 54; ASTM A193, grade B7 or B7-M steel for the studs or bolts, grade 8 socket head bolts or set screws 55; and ASTM A194 grade 2H or 2HM nuts. The various parts of the connector of this invention, especially the gripping collets, are preferably heat treated and quenched, followed by tempering, to increase strength and hardness.

Figure 2:
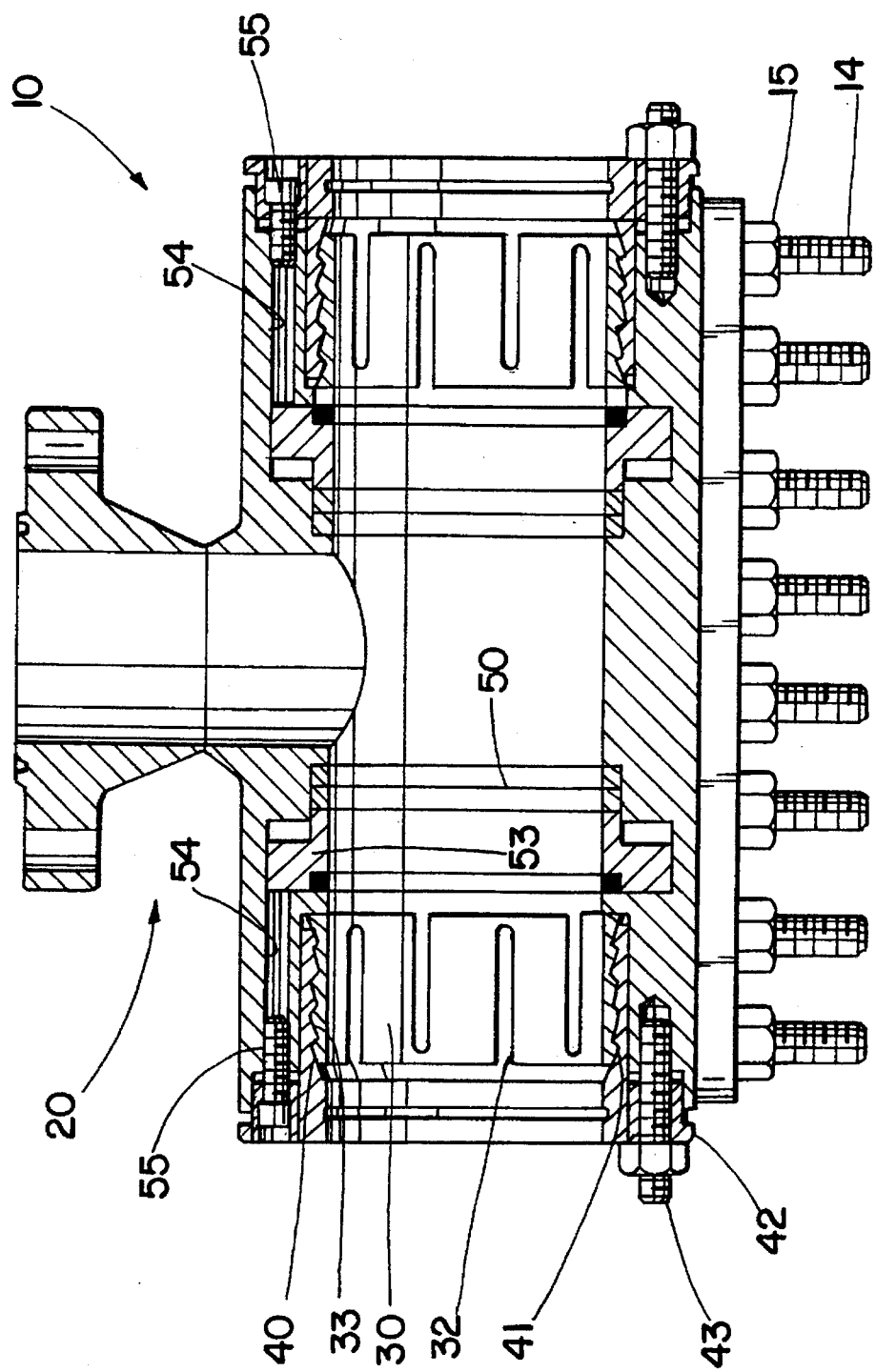
FIG. 2 shows a cross-sectional view of one embodiment of a connector of this invention.

Referring to FIG. 2, there is shown a cross-sectional view of a connector of this invention. In FIG. 2 there are shown a pair of gripping (slip) collets 30 on opposed ends of the connector 10. The gripping collets 30 have ramps 33 in slidable engagement with the ramps 43 of the collet driver sleeve 41 of the collet driver 40. Threaded bolts 43, when tightened, apply lateral (axial) pressure whereby the ramps 33 of gripping collet 30 slide against the ramps 43 of collet drivers 40 such that the surface of the gripping collets 30 becomes engaged with the carrier pipe. The slits 32 allow the gripping collets 30 represented in FIG. 2 to deform to uniformly engage the carrier pipe.

In FIG. 2, the branch tap 20 is shown to be attached to an upper body portion, with the bore of the branch tap 20 intersecting the longitudinal bore of the connector 10. A set of seals 50, positioned internal to gripping collets 30 and external to the branch tap 20, are actuated by means of lateral pressure from packer ring 53, with packer ring 53 itself being actuated by application of lateral pressure from packer rod 54 when set screws 55 are tightened. It is seen that the gripping collets and seals are independently set. Studs 14 in conjunction with nuts 19 allow the connector 10 to be secured around a carrier pipe to thereby allow the upper and lower body portions 11 and 12 to form a continuous housing defining a tubular body.

Figure 3:
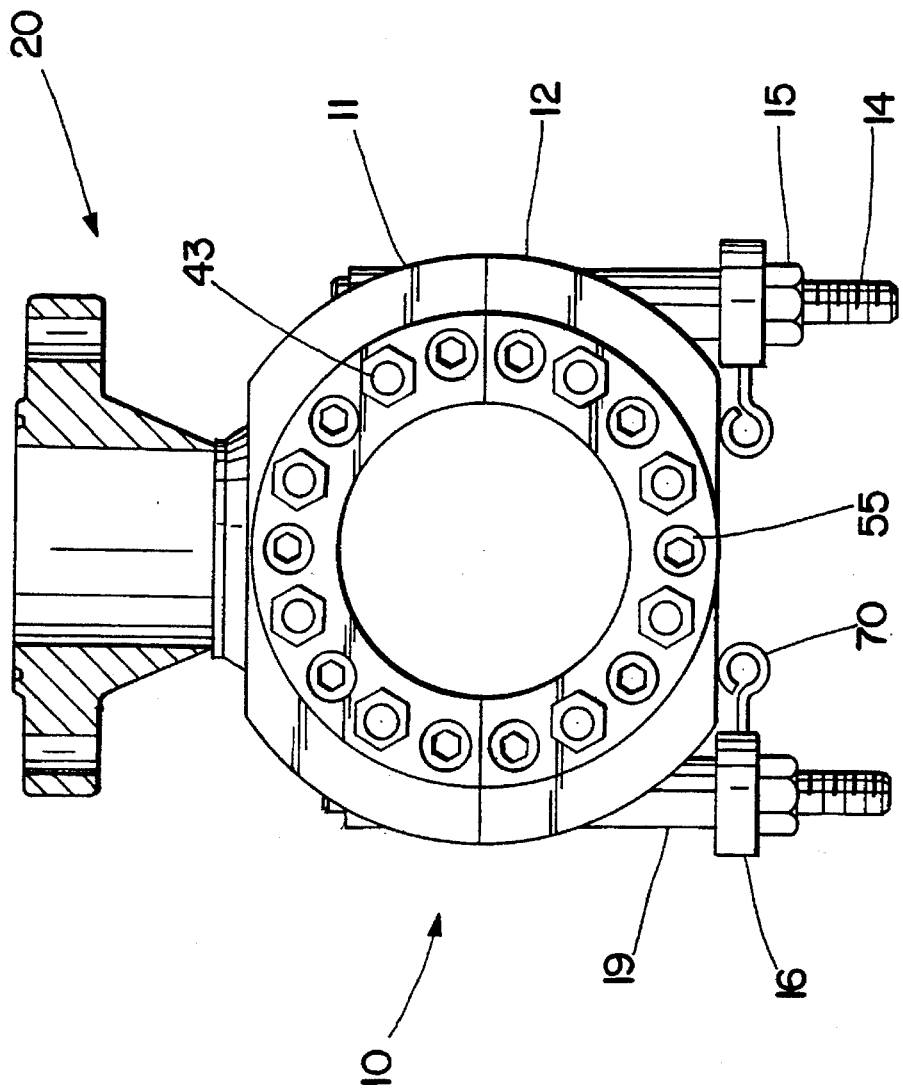
FIG. 3 shows an end view of one embodiment of the connector of this invention.

In FIG. 3, there is shown an end view of a connector of this invention. A branch tap 20, which can be secured by welding, is connected to the upper body portion 11 of connector 10. Body studs 14 extend out below lower body portion 12. There are also shown eye screws 70 which can be used to secure body studs 14 during transportation, prior to connector 10 being attached to a carrier pipe, after nuts are removed from the studs 14 on the upper body portion 12. Thus, the studs 14 may be partially removed from the transverse bores so that the upper and lower body portions 11 and 12 can be levered open through use of, for example, hydraulic hinges, not shown. There are also shown in FIG. 3 set screws 55 for initiating independent setting of the seals 50, and bolts 43 for securing the collet drivers 40 to the connector 10 end and for drawing collet drivers 40 inward to set gripping collets 30.

During use, a connector as shown in FIGS. 1, 2 and 3 with body studs 14 removed, is attached to hydraulic hinges 60 which are activated such that the upper and lower body portions 11 and 12 are opened. The upper or lower body portions 11 and 12 are positioned over the carrier pipe of interest and the hydraulic hinges are then activated such that the upper and lower body portions 11 and 12 close around the carrier pipe. The connector 10 is secured about the carrier pipe by tightening of the nuts on the body studs 14 after the body studs 14 are inserted into the transverse bores. The hydraulic hinges 60 are removed. Generally, the gripping collets 30 are set first. The gripping collets are set by tightening, independent of the tightening of set screws 55, the bolts 43 such that the collet driver 40 moves laterally to thereby apply pressure via ramps 43 against the ramps 33 of the gripping collet 30 whereby ramps 43 slide laterally toward the opposite end of the connector 10 to force the gripping collet 30 toward the central axis of the transverse bore of the connector 10, with the bolts 43 being tightened until the gripping collets 30 sufficiently grip the carrier pipe. The gripping collets 30 can be greased by injection to protect the gripping collets 30 from sea water. The seals 50 are set by tightening the set screws 55 to an appropriate tightness, which engage packer rods 54 to thereby provide lateral pressure against packer rings 53 that themselves apply pressure against seals 50. Then a hole is bored into the carrier pipe through the bore of branch tap 20 followed by establishing a connection with a branch pipe by connecting a flange of the branch pipe to the branch tap flange 22.

The connector of this invention can be used as a branch tap connector, to provide a tee connection to a carrier pipe. In this regard, tools and devices well known to one of skill in the art can be employed to facilitate such tapping procedure, including tools for tapping the carrier pipe while material is flowing under pressure through the carrier pipe.

Further modifications and alternative embodiments of this invention will be apparent to those skilled in the art in view of this description. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the shape, size, and arrangement of parts. For example, equivalent elements or materials may be substituted for those illustrated and described herein, and certain features of the invention may be utilized independently of the use of other features, all as would be apparent to one skilled in the art after having the benefit of this description of the invention.

What is claimed is:

1. A clamp useful for connecting a tie-in line transversely to a carrier pipe, comprising:
   a lower body portion and a upper body portion that when connected together define a tubular bore, the lower and upper body portions being adapted to clamp onto the carrier pipe;
   a set of gripping collets positioned with the tubular sleeve bore proximate opposed ends of the upper and the lower body portions to engage such a carrier pipe;
   a branch tap positioned between the gripping collets and extending from one of the body portions transversely to the tubular bore;
   a first seal and a second seal for providing a seal between the carrier pipe and the upper and the lower body portions the first and second seal positioned within the transverse bore and between the gripping collets and the branch tap;
   means for setting the first and second seal to provide a seal between the carrier pipe and the upper and lower body portions;
   a set of axial seals to form axially extending seals between the upper and lower body portions during use and to connect the first and second seals during use; and
   collet drivers at opposed ends of the upper and lower body portions for actuating the gripping collects, each collet driver comprising a collet driver sleeve and a collet driver flange.

2. The clamp of claim 1, wherein the gripping collets and collet drivers are arcuate in shape such that when the upper and lower body portions are connected, the gripping collets and collet drivers each form concentric rings.

3. The clamp of claim 1, wherein the gripping collets are serrated on surfaces that engage the carrier pipe during use.

4. The clamp of claim 1, wherein the gripping collets have axial slits extending from opposed ends, the slits in alternating arrangement such that adjacent slits are directed in opposite directions.

5. The clamp of claim 1, wherein the gripping collets and collet driver sleeves define complementary ramps to engage slidably with each other so that relative displacement during use will force the gripping collets into engagement with the carrier pipe.

6. The clamp of claim 1, wherein each collet driver flange has a plurality of collet bores for receiving bolts or studs for attaching the collet drivers to body portions and for use in drawing the collet driver sleeves toward the opposite end of the body portions to radially compress the gripping collets for engaging a carrier pipe during use.

7. The clamp of claim 1, wherein the first and second seals are positioned in a recess in each body portion.

8. The clamp of claim 1, wherein the means for setting the seals are a pair of a packer rings for setting the seals and packer rods for actuating the packer rings, the packer rings being positioned in recesses in the body portions proximate to the seals such that the packer rings are in slidable communication with the seals, the packer rods being positioned in axially extending bores in the body portions.

9. The clamp of claim 8, further comprising threaded set screws that are threaded into the axially extending bores, the threaded set screws being positioned such that upon being screwed into the body portions the threaded set screws engage the packer rods to thereby apply axial pressure to the seals such that the seals engage the pipe during use.

10. The clamp of claim 1, wherein the branch tap comprises a branch tap flange and a branch tap body, the branch tap body being connected to the upper or lower body portion, the branch tap body and branch tap flange defining a branch tap bore extending into the sleeve bore.

11. A clamp useful for connecting a tie-in line to a carrier pipe, comprising:
    a lower body portion and a upper body portion that when connected together define a tubular sleeve bore, the lower and upper body portions being adapted to clamp onto the carrier pipe;
    a set of gripping collets and collet drivers on opposed ends of upper and lower body portions, the collet drivers for actuating the gripping collets to engage the carrier pipe,
    the gripping collets and collet drivers being annular in shape such that when the upper and lower body portions are connected, the gripping collets and collet drivers each form concentric rings, wherein the gripping collets are serrated on surfaces that engage the carrier pipe and are beveled to form at least one ramp on sides directed away from the sleeve bore,
    the gripping collets having axial slits to allow for radial compression of the gripping collets during use,
    the collet drivers each comprising a collet driver sleeve and a collet driver flange,
    each collet driver sleeve being beveled to form at least one ramp adapted for slidable engagement with the corresponding ramps of the gripping collets upon application relative displacement,
    each collet driver flange having a plurality of collet bores for receiving bolts or studs for attaching the collet driver to an end of each body portion and for use in drawing the collet driver sleeve toward the opposite end of each body portion to thereby displace the ramps relatively to each other and thereby force the gripping collets radially inward for the gripping collets to forcibly engage the pipe during use;

the lower body portion and upper body portion each having a pair of seals comprising a first elastomer seal and a second elastomer seal, the first and second elastomer seals together defining annular rings for sealing the connector, the seals being positioned in a recess in each body that is between the gripping collets and the branch tap;

the lower body portion and the upper body portion having a pair of a packer rings for setting the seals, and having packer rods for actuating the packer rings, the packer rings being positioned in recesses in the body portions proximate to the seals such that the packer rings are in slidable communication with the seals, the packer rods being positioned in axially extending bores in the body portions, the axially extending bores being aligned with the collet bores of the collet driver flanges, threaded set screws that are threaded into the axially extending bores, the threaded set screws being positioned such that upon being screwed into the body the threaded set screws engage the packer rods to thereby apply axial pressure to the seals such that the seals engage the pipe;

a branch tap comprising a branch tap flange and a branch tap body, the branch tap body being connected to the upper body portion or the lower body portion between the first and second elastomer seals, the branch tap body and branch tap flange defining a branch tap bore extending into the sleeve bore.

12. A pipeline connector for mourning onto a carrier pipe to provide a branch tap for use in connecting a branch pipe transversely to such a carrier pipe, the pipeline connector comprising:

a lower body portion and an upper body portion adapted to be clamped together about such a carrier pipe to define a tubular bore for receiving such a carrier pipe;

a branch tap for use in connecting to a branch line, the branch tap extending from one of the body portions transversely to the tubular bore of the pipeline connector;

a set of gripping collets positioned within the tubular bore on opposed sides of the branch tap to form a gripping engagement between the pipeline connector and a carrier pipe during use;

collet drivers at opposed ends of the upper and lower body portions for actuating the gripping collects, each collet driver comprising a collet driver sleeve and a collet driver flange;

a set of annularly extending seals positioned within the tubular bore on opposed sides of the branch tap to form a seal between the tubular bore and a carrier pipe during use, the annularly extending seals being positioned between the branch tap and the gripping collets;

means tier setting the seals; and axial seals to form a seal between the upper and lower body portions during use and to connect the annular seals during use.

13. A pipeline connector for mounting onto a carrier pipe to provide a branch tap for use in connecting a branch pipe transversely to such a carrier pipe, the pipeline connector comprising:

a lower body portion and an upper body portion adapted to be clamped together about such a carrier pipe, the body portions having tubular bore sections to define a tubular bore for receiving such a carrier pipe:

a branch tap for use in connecting to a branch line, the branch tap extending from one of the body portions transversely to the tubular bore or the pipeline connector;

two sets of gripping collets positioned within the tubular bore sections, the one set being positioned to one side of the branch tap and the other set being positioned to the other side of the branch tap, the sets of collets being adapted to form a gripping engagement between the pipeline connector and a carrier pipe during use;

collet drivers at opposed ends of the upper and lower body portions for actuating the gripping collects each collet driver comprising a collet driver sleeve and a collet driver flange;

one set of annular seals being positioned in the tubular bore sections between the branch tap and one of the sets of gripping collets, and another set of annular seals being positioned in the tubular bore sections between the branch tap and the other of the sets of gripping collets, the sets of annular seals being adapted to form annularly extending seals between the tubular bore and a carrier pipe during use;

means for setting the seals; and a set of axial seals to form axially extending seals between the upper and lower body portions during use and to connect the annular seals during use.

14. A pipeline connector according to claim 13, wherein each set of gripping collets comprises an arcuate gripping collet positioned within the one tubular bore section and an arcuate gripping collet positioned within the other tubular bore section, the arcuate gripping collets being shaped so that they define annular gripping collets when the body portions are clamped together.

15. A pipeline connector according to claim 14, wherein the tubular bore sections have arcuate collet recesses within which the arcuate gripping collets are positioned.

16. A pipeline connector according to claim 14, wherein each arcuate gripping collet has a plurality of axially extending slits to allow for radial compression of the collets during use to engage with a carrier pipe.

17. A pipeline connector according to claim 16, wherein the axially extending slits extend inwardly alternately from opposed ends of the arcuate gripping collets.

18. A pipeline connector according to claim 13, in which each set of collet drivers comprises an arcuate collet driver positioned within one of the tubular bore sections and an arcuate collet driver positioned within the other of the tubular bore sections so that they together constitute an annular collet driver when the upper and lower body portions have been clamped together.

19. A pipeline connector according to claim 13, in which each collet driver flange is integral with its collet driver sleeve.

20. A pipeline connector according to claim 13, in which each arcuate gripping collet has a serrated internal surface for forming a gripping engagement with the outer surface of a carrier pipe during use.

21. A pipeline connector according to claim 13, in which each arcuate gripping collet has a plurality of axially inclined ramps, and in which the collet driver sleeves have complementary axially inclined ramps so that when the collet drivers are axially displaced relatively to the arcuate gripping collets during use, the complementary ramps cooperate for the collet drivers to compress the gripping collets radially into engagement with the outer surface of a carrier pipe.

22. A pipeline connector according to claim 21, in which at least one ramp of the collet driver sleeve incorporates a shoulder which limits the axial travel of the collet driver sleeve with respect to cooperative gripping collets during actuation and operation.

23. A pipeline connector according to claim 13, including a plurality of axially extending studs connecting the collet driver flanges to the body portions, whereby nuts can be tightened on the studs during use to cause the collet drivers to be axially displaced relatively to the gripping collets to actuate the gripping collets.

24. A pipeline connector according to claim 13, wherein each set of annular seals comprises at least one arcuate seal positioned in a seal groove in one of the tubular bore sections, and at least one arcuate seal positioned in a seal groove in the other of the tubular bore sections so that they define an annular seal when the body portions are clamped together.

25. A pipeline connector according to claim 24, including two sets of packer rings adapted to be displaced in an axial direction for setting the two sets of annular seals during use.

26. A pipeline connector according to claim 25, in which each set of packer rings comprises an arcuate packer segment positioned in a packer recess in one of the tubular bore sections, and an arcuate packer segment positioned in a packer recess in the other of the tubular bore sections to define an annular packer ring when the two body portions are clamped together during use.

27. A pipeline connector according to claim 26, including a plurality of axially extending packer studs positioned in packer bores in the body portions, the packer studs being adapted to be displaced axially to displace the packer rings and set the annular seals during use.

28. A pipeline connector according to a claim 13, in which a body portion has axially extending seating surfaces on each side of the tubular bore sections to cooperate when the body portions are clamped together, and in which each seating surface has an axially extending slot for receiving portion of an axial seal during use.

29. A pipeline connector according to claim 13, having a pair of hinge brackets removably mounted on opposed axial ends of the body portions, to hingedly connect the two body portions together along one of their axial sides.

30. A pipeline connector according to claim 29, in which the hinge brackets include hydraulic cylinders for use in displacing the body portions relatively to each other about their hinged connection.

31. A pipeline connector according to claim 13, including a plurality of axially spaced body stud bores on each side of the body portions for receiving body studs for use in clamping the body portions together during use.

32. A pipeline connector according to claim 31, including axially extending body stud bars associated with the body studs to provide bearing surfaces against which pre-tensioning devices can bear during pre-tensioning of body studs when the body portions are being mounted onto a carrier pipe.

33. A pipeline connector according to claim 13, in which the branch tap has a conventional weldneck flange integrally connected thereto.

* * * * *

UNITED STATES PATENT AND TRADEMARK OFFICE
CERTIFICATE OF CORRECTION

PATENT NO.   :   5,590,913
DATED        :   January 7, 1997
INVENTOR(S)  :   Morris et al.

It is certified that error appears in the above-identified patent and that said Letters Patent is hereby corrected as shown below:

In claim 1, column 7, line 48, please delete "portions the first" and insert -- portions, the first -- therefor.

In claim 12, column 9, line 57, please delete "tier" and insert -- for -- therefor.

In claim 13, column 10, line 5, please delete "or" and insert -- of -- therefor.

Signed and Sealed this

Eighth Day of April, 1997

Attest:

BRUCE LEHMAN

*Attesting Officer*    *Commissioner of Patents and Trademarks*